US012422936B1

(12) United States Patent
Chen (10) Patent No.: US 12,422,936 B1
(45) Date of Patent: Sep. 23, 2025

(54) EXTENDED REALITY SYSTEM AND METHOD FOR OPERATING THE SAME (71) Applicant: HTC Corporation, Taoyuan (TW)

(72) Inventor: Ching-Chun Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/611,675

(22) Filed: Mar. 20, 2024

(51) Int. Cl.
*G06F 3/01* (2006.01)
*G06F 3/04812* (2022.01)
*G06F 3/04815* (2022.01)
*G06F 3/0483* (2013.01)
*G06F 3/04845* (2022.01)

(52) U.S. Cl.
CPC .............. *G06F 3/017* (2013.01); *G06F 3/013* (2013.01); *G06F 3/04812* (2013.01); *G06F 3/04815* (2013.01); *G06F 3/0483* (2013.01); *G06F 3/04845* (2013.01)

(58) Field of Classification Search
CPC ...... G06F 3/017; G06F 3/013; G06F 3/04812; G06F 3/04815; G06F 3/0483; G06F 3/04845
See application file for complete search history.

(56) References Cited

U.S. PATENT DOCUMENTS

2016/0224123 A1* 8/2016 Antoniac ............ G06F 3/04815
2019/0073044 A1* 3/2019 Komaki .................. G06F 3/017

FOREIGN PATENT DOCUMENTS

| CN | 117093078 A | 11/2023 |
| TW | 202016696 A | 5/2020 |
| TW | 202331471 A | 8/2023 |

OTHER PUBLICATIONS

The office action of the corresponding Taiwanese application No. TW113134082 issued on Apr. 21, 2025.

* cited by examiner

*Primary Examiner* — Adam R. Giesy
(74) *Attorney, Agent, or Firm* — CKC & Partners Co., LLC (57) ABSTRACT

An extended reality system is provided. The extended reality system includes a camera, a display device and a processor. The camera captures images. The display device displays an extended reality with an application window. The processor performs: detecting a first hand and a second hand in the images; controlling a cursor in the application window according to where a finger of the first hand is on the palm of the second hand; and determining an operation to the application window according to a gesture of the first hand on the palm of the second hand.

20 Claims, 8 Drawing Sheets

EXTENDED REALITY SYSTEM AND METHOD FOR OPERATING THE SAME

BACKGROUND

Field of the Invention

The present disclosure generally relates to extended reality system and method, and in particular, to a system and a method for detecting gestures for controlling an application displayed in an extended reality environment.

Description of Related Art

Various types of visual content (e.g., films, applications, games, etc.) can be implemented and displayed in an extended environment. Some devices such as a head mounted device enable a user to view the visual content and interact with the extended environment. These devices usually utilize a ray casting control method or a hand tracking method for interacting with the extended environment. However, the ray casting control method may need an additional controller which is inconvenient, and the hand tracking method without a pressure feedback while pressing gives an unnatural feel to the user. Accordingly, there is a need for the industry to provide extended reality system and method solving the aforementioned problems.

SUMMARY

In some embodiments, an extended reality system is provided. The extended reality system includes a camera, a display device and a processor. The camera captures images. The display device displays an extended reality with an application window. The processor performs: detecting a first hand and a second hand in the images; controlling a cursor in the application window according to where a finger of the first hand is on the palm of the second hand; and determining an operation to the application window according to a gesture of the first hand on the palm of the second hand.

In some embodiments, the processor recognizes a text to input to an user interface element in the application window according to a trace of the finger of the first hand on the palm of the second hand.

In some embodiments, the processor performs a click operation to where the cursor is in the application window in response to the finger of the first hand clicking the palm of the second hand.

In some embodiments, the processor performs a resize operation to a content displayed in the application window in response to two fingers of the first hand pinching on the palm of the second hand.

In some embodiments, the processor performs a turning page operation to a content displayed in the application window in response to two fingers of the first hand moving on the palm of the second hand for a first time shorter than a predefined time.

In some embodiments, the processor performs a pan operation to a content displayed in the application window in response to two fingers of the first hand moving on the palm of the second hand for a second time longer than the predefined time.

In some embodiments, the processor performs: detecting a first position where the finger of the first hand first touches the palm of the second hand and a second position where the finger of the first hand leaves from the palm of the second hand; and moving the cursor according to a vector between the first position and the second position.

In some embodiments, the extended reality system of claim 1 further including a sensor that senses eye closing, in which the processor is further configured to perform a click operation to where the cursor is in the application window in response to the sensor sensing an eye closing.

In some embodiments, an extended reality system is provided. The extended reality system includes a camera, a display device and a processor. The first camera captures images. The display device displays an application window controlled by a touchpad operation. The processor performs: detecting a first hand and a second hand in the images; and determining a gesture of a first hand on the palm of a second hand as the touchpad operation to the application window.

In some embodiments, the processor moves a cursor in the application window in response to one finger of the first hand moving on the palm of the second hand.

In some embodiments, the extended reality system further includes a second camera to perform eye tracking, in which the processor moves a cursor in the application window according to the eye tracking in response to the first hand is separated from the second hand by a predefined distance.

In some embodiments, a method for operating an extended reality system is provided. The method includes: displaying an extended reality with an application window inside; capturing images of a first hand and a second hand; controlling a cursor in the application window according to where a finger of the first hand is on the palm of the second hand; determining a touchpad operation to the application window according to a gesture of the second hand on the palm of the first hand; and adjusting a content in the application window according to the touchpad operation.

In some embodiments, the method further includes in response to the second hand being clenched for a first time shorter than a predefined time, determining the touchpad operation to the application window as a short click operation that clicks where the cursor is.

In some embodiments, the method further includes in response to the second hand being clenched for a second time longer than the predefined time, determining the touchpad operation to the application window as a long click operation that clicks where the cursor is and holds for the second time.

In some embodiments, the method further includes: displaying the cursor with a first color in response to the first hand touching the second hand; displaying the cursor with a second color in response to the first hand and the second hand separated by a first distance shorter than a predefined distance; and hiding the cursor in response to the first hand and the second hand separated by a second distance longer than the predefined distance.

In some embodiments, the method further includes in response to the first hand and the second hand separated by the second distance longer than the predefined distance, determining the touchpad operation to the application window as a short click operation according to a first eye being close and a second eye being open.

In some embodiments, the method further includes in response to the first hand and the second hand separated by the second distance longer than the predefined distance, determining the touchpad operation to the application window as a long click operation according to the first eye being open and the second eye being close.

In some embodiments, the method further includes in response to the first hand and the second hand separated by a first distance longer than a predefined distance, moving the cursor according to a position of the first hand.

In some embodiments, the method further includes recognizing a text to input to an user interface element in the application window according to traces of the finger of the first hand on the palm of the second hand.

In some embodiments, the method further includes in response to two fingers of the first hand touching the palm of the second hand, displaying two arrows starting from the cursor in the application window, in which the lengths of the two arrows is according to vectors of the two fingers moved on the palm of the second hand.

BRIEF DESCRIPTION OF THE DRAWINGS

Aspects of the present disclosure are best understood from the following detailed description when read with the accompanying figures. It is noted that, various features are not drawn to scale. In fact, the dimensions of the various features may be arbitrarily increased or reduced for clarity of discussion.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., are used herein to describe various elements, these elements should not be limited by these terms. These terms are used to distinguish one element from another. For example, a first element could be termed a second element, and, similarly, a second element could be termed a first element, without departing from the scope of the embodiments.

As used herein, the terms "comprising," "including," "having," "containing," "involving," and the like are to be open-ended, i.e., to mean including but not limited to.

Reference will now be made in detail to the embodiments of the present disclosure, examples of which are illustrated in the accompanying drawings. Wherever possible, the same reference numbers and annotations are used in the drawings and the description to refer to the same or like parts.

Figure 1:
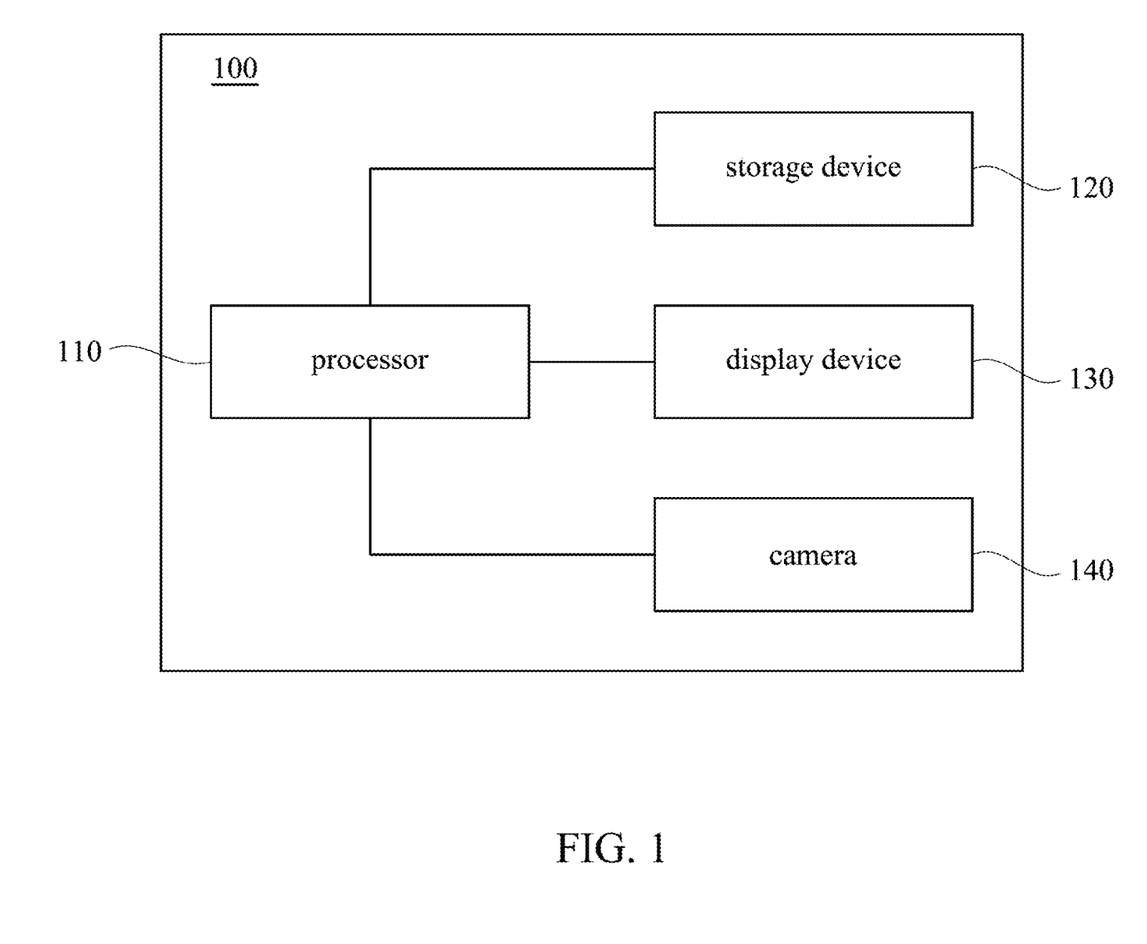
FIG. 1 is a schematic diagram of a system in accordance with some embodiments of the present disclosure.

Reference is now made to FIG. 1. FIG. 1 is a schematic diagram of a system 100 in accordance with some embodiments of the present disclosure. In various embodiments, the system 100 may be an extended reality (XR) system, for example, a virtual reality (VR) system, an augmented reality (AR) system, a mixed reality (MR) system, etc. According to some embodiments, the system 100 may comprise a head mounted device (HMD), a computer and/or a smart device like smartphone.

As shown in FIG. 1, in some embodiments, the system 100 comprises a processor 110, a storage device 120, a display device 130 and a camera 140. In at least one embodiment, the processor 110, the storage device 120, the display device 130 and the camera 140 are included in a head mounted device.

For illustration, the processor 110 is electrically connected to the storage device 120, the display device 130 and the camera 140. It should be understood that, in the descriptions of the embodiments and the scope of the patent application, the description of "electrical connection" may generally refer to the indirect electrical coupling of one element to another element through other elements, or the direct electrical coupling of an element without passing through other elements.

In some embodiments, the electrical connections depicted in FIG. 1 can be replaced by wireless communication connections. For example, the processor 110 may connect to the camera 140 through a wireless network.

According to some embodiments, the processor 110 may be central processing units (CPU), other programmable general-purpose or special-purpose micro control units (MCU), digital signal processors (DSP), application-specific integrated circuits (ASIC), graphics processing units (GPU), arithmetic logic units (ALU), complex programmable logic devices (CPLD), field-programmable gate arrays (FPGA), or other similar components or a combination of the above components.

In various embodiments, the storage device 120 may be fixed or removable random access memory (RAM), read-only memory (ROM), flash memory, a hard disk, or any other similar device, or a combination of the above. In application, according to some embodiments, the storage device 120 is used to record programs that are executable by the processor 110.

In some embodiments, the display device 130 may be a display device embedded in a head mounted device. The display device 130 is used to provide visual content for the user. For example, in some embodiments, the display device 130 in a head mounted device displays an extended reality environment to the wearer of the head mounted device.

In some embodiments, the camera 140 may be a camera embedded in the head mounted device. The camera 140 is used to capture images of the hands of the user. For example, in some embodiments, the camera 140 in the head mounted device capture images of the hands of the wearer of the head mounted device.

The system 100 is used to provide an extended reality environment with an application window inside. In some embodiments, the application window is a two dimensional (2D) based application window projected to the extended reality environment. The display device 130 displays the extended reality environment with the application window. The application displayed in the application window is operated by the processor 110 according to user inputs. For example, the processor 110 controls the content/elements displayed in the application window according to hand gestures in images captured by the camera 140.

The configurations of FIG. 1 are given for illustrative purposes. Various implements are within the contemplated scope of the present disclosure. According to various embodiments, the system 100 may include additional devices to detect user inputs. For example, in some embodiments, the system 100 further includes an eye tracking device which may be a camera, a sensors, etc. for detecting eye motions. In some embodiments, the system 100 further includes a motion sensing device for sensing a hand movement, in which the motion sensing device may be a wearable sensor or a hand held controller.

Figure 2:
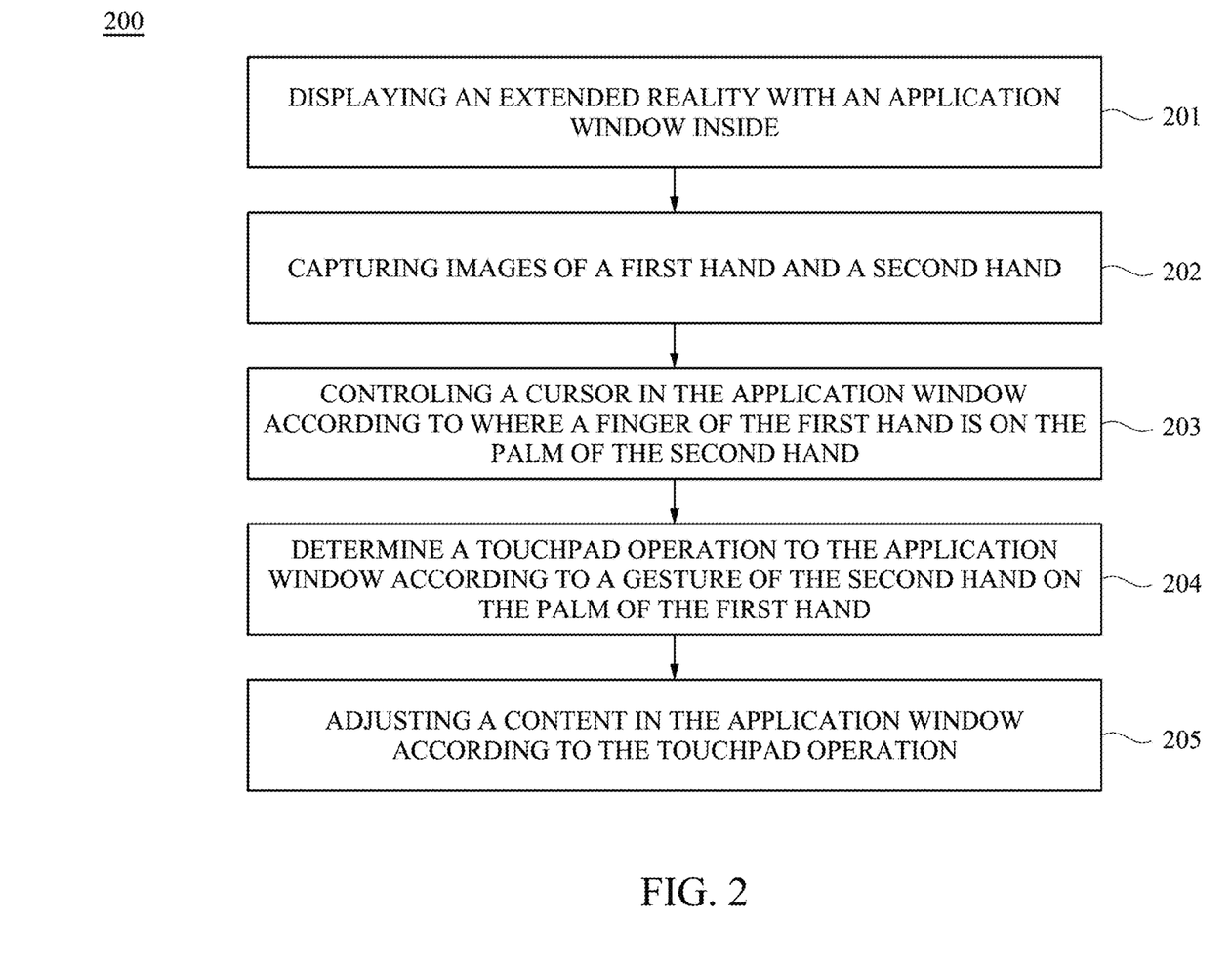
FIG. 2 is a flowchart of a method for operating the system depicted in FIG. 1 in accordance with some embodiments of the present disclosure.

Reference is now made to FIG. 1 and FIG. 2. FIG. 2 is a flowchart of a method 200 for operating the system 100 depicted in FIG. 1 in accordance with some embodiments of the present disclosure. As shown in FIG. 2, the method 200 includes operations 201-205 that are described below with reference to FIGS. 1-10. It should be noted that, additional operations can be provided before, during, and after the operations shown by FIG. 2, and some of the operations described below can be replaced or eliminated, for additional embodiments of the method. The sequence in which these operations is performed, unless explicitly stated otherwise, can be altered depending on actual needs; in certain cases, all or some of these steps can be performed concurrently.

In operation 201, the processor 110 executes a program/codes stored in the storage device 120 to run an application. Then, according to control signals from the processor 110, the display device 130 displays an extended reality environment and displays an application window of the application inside the extended reality environment.

In some embodiments, the application is a 2D based application (e.g., conventional mobile or desktop applications designed to be displayed by touch screen or monitor) and the application window of the application is used to display content/elements of the application run by the processor 110. In some embodiments, the application window is a plane displayed in the three dimensional extended reality environment.

In operation 202, the camera 140 captures images of two hands of a user. The processor 110 determines one of two hands detected in the images as a dominant hand and determines the other one of the two hands as a non-dominant hand. In some embodiments, the processor 110 determines the non-dominant hand as a virtual touchpad. Specifically, the processor 110 detects operations of the dominant hand to the non-dominant hand and determines these operations as touchpad operations to a touchpad. Then, the processor 110 operates the application according the touchpad operations.

In some embodiments, according to a user setting, the processor 110 determines the hand in the right side of the images as the dominant hand and the other hand in the left side of the images as the non-dominant hand. In contrast, according to a different user setting, the processor 110 determines the hand in the left side of the images as the dominant hand and the other hand in the right side of the images as the non-dominant hand.

In some embodiments, the processor 110 determines whether one hand in each of the images is a dominant hand or a non-dominant hand according to the gesture of the hand. In some embodiments, the processor 110 determines an open hand (spread palm) as the non-dominant hand and the other hand as the dominant hand.

In operation 203, the processor 110 controls a cursor in the application window according to detected gestures of the hands in the images. For example, the processor 110 controls the cursor according to the motion of a finger of the dominant hand relative to the non-dominant hand. Specifically, in some embodiments, when the processor 110 detects only one finger of the dominant hand touching the palm of the non-dominant hand, the processor 110 controls a movement of the cursor in the application window according to a movement of the finger on the palm.

Figure 3:
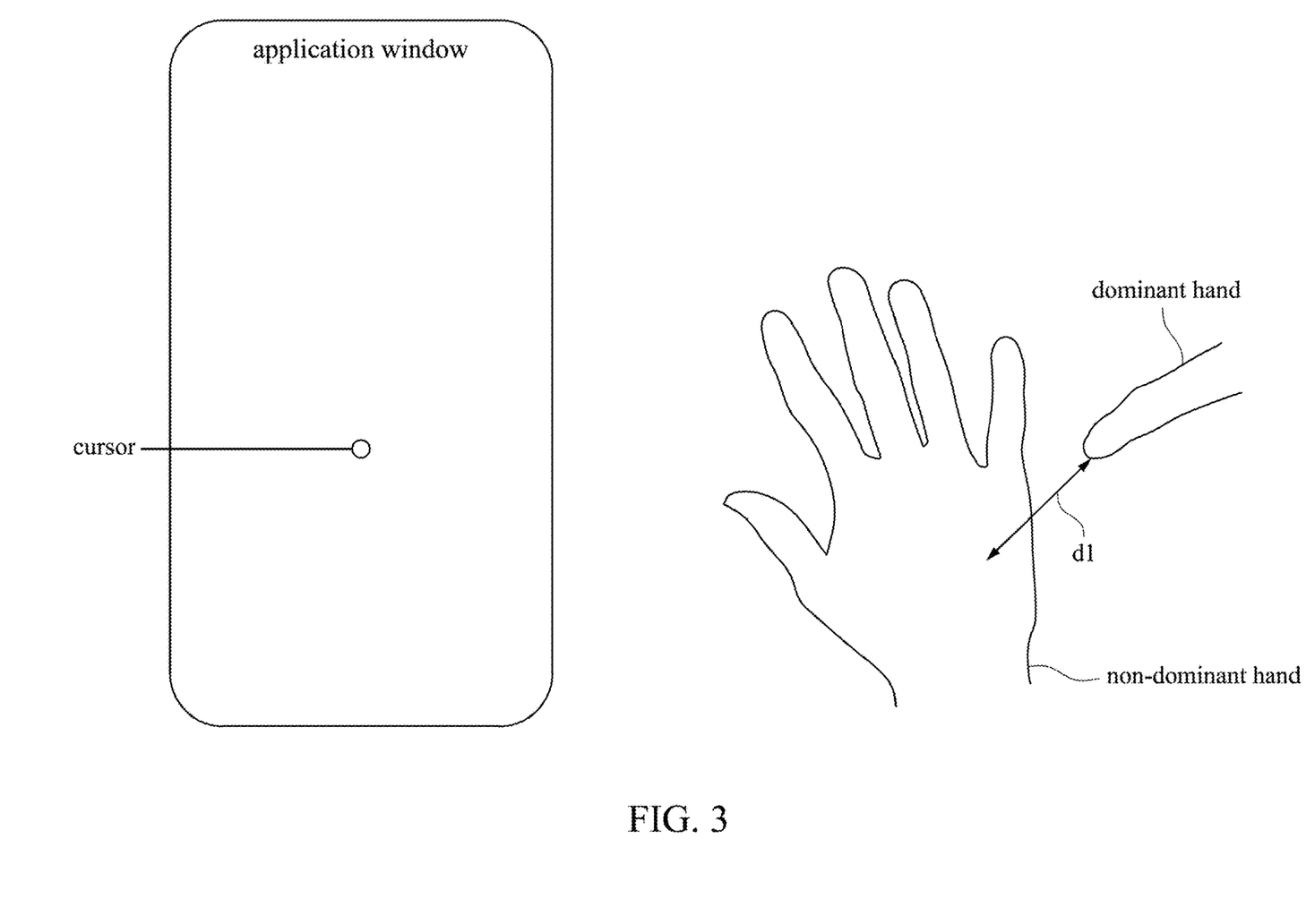
FIGS. 3-5 are schematic diagrams of example operations to a cursor in an application window according to hand gestures, corresponding to the system in FIG. 1 and the method in FIG. 2, in accordance with some embodiments of the present disclosure.
Figure 4:
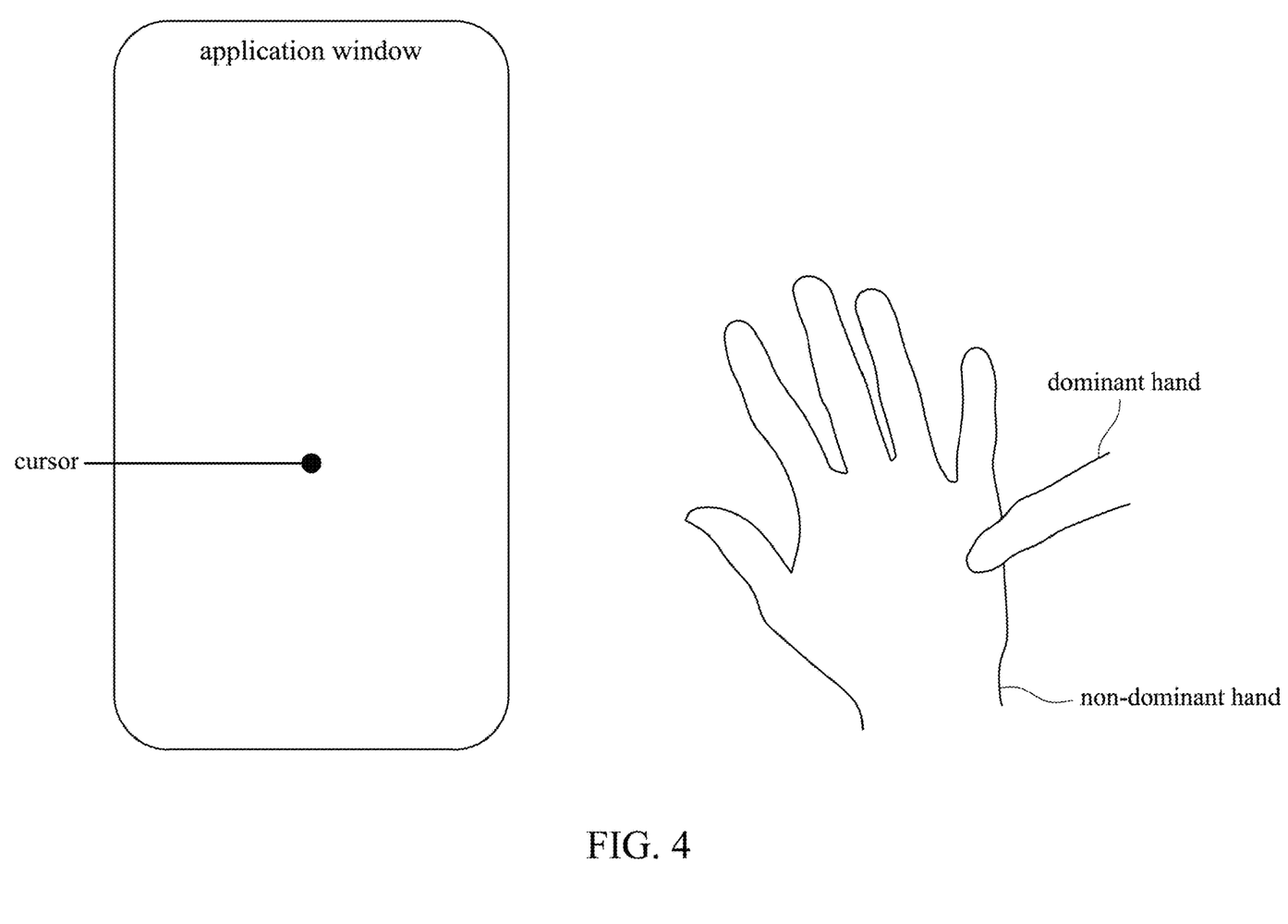
Figure 5:
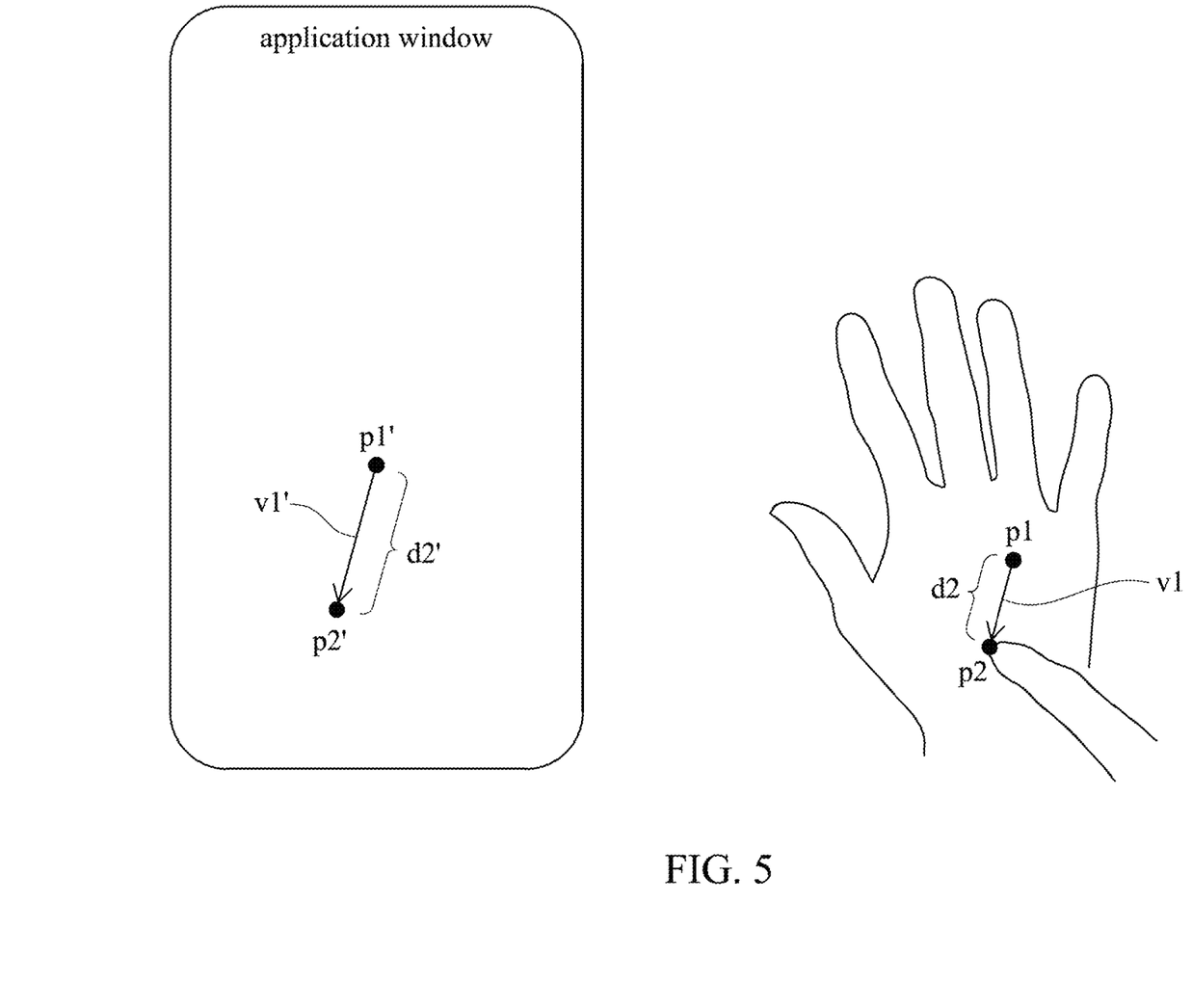

Reference is now made to FIGS. 1-2 and FIGS. 3-5. FIGS. 3-5 are schematic diagrams of example operations to a cursor in an application window according to hand gestures, corresponding to the system 100 in FIG. 1 and the method 200 in FIG. 2, in accordance with some embodiments of the present disclosure.

As shown in FIG. 3, the processor 110 determines whether to display the cursor in the application window according to a distance d1 between the dominant hand and the non-dominant hand. In some embodiments, the distance d1 is the shortest distance between the dominant hand and the non-dominant hand determined by the processor 110. In some embodiments, the distance d1 is the distance between a finger of the dominant hand and the palm of the non-dominant hand determined by the processor 110.

For example, when the processor 110 determines that the distance d1 having a value smaller than (or "smaller than or equal to") a predetermined value (e.g., 3 centimeters) but greater than zero according to the image captured by the camera 140, the processor 110 generates a control signal to the display device 130 and the display device 130 displays the cursor in response to the control signal. Specifically, in some embodiments, the display device 130 displays the cursor with a first color (e.g., gray) as shown in FIG. 3, in response to the control signal indicating that the distance d1 is between the predetermined value and zero.

On the contrary, when the processor 110 determines that the distance d1 having a value greater than the predetermined value according to the image captured by the camera 140, the processor 110 generates another control signal to the display device 130 and the display device 130 stops displaying the cursor in response to this control signal. Specifically, according to some embodiments, the display device 130 invisiblizes (stops displaying) the cursor (or make the cursor transparent) in response to the control signal indicating that the distance d1 is greater than the predetermined value.

Similarly, as shown in FIG. 4, when the processor 110 determines that the distance d1 having a value equal to zero (i.e., the finger of the dominant hand touching the palm of the non-dominant hand) according to the image captured by the camera 140, the processor 110 generates another control signal to the display device 130 and the display device 130 displays the cursor with a second color in response to the control signal. Specifically, as shown in FIG. 4, in some embodiments, the display device 130 displays the cursor with a second color (e.g., blue) different from the first color (e.g., gray), in response to the control signal indicating that the distance d1 is equal to zero, in which the first color is the displayed color of the cursor when the distance d1 is between the predetermined value and zero. The display device 130 displays the cursor with different color to indicate the distance of the two hands and notify the user that whether the processor 110 determining that the user's finger touches the palm.

In some embodiments, the position to display the cursor in the application window is according to where the cursor is in the last operation to the cursor. For an example in which the processor 110 detects a finger controlling the cursor, when the finger leaves the palm of the non-dominant hand, from touching each other to separated by a distance over the distance d1, the cursor stops moving and the display device 130 stops displaying the cursor. Thereafter, the processor 110 detects that the finger approaches the palm to be within the distance d1 from the palm, and in response to this detection, the display device 130 displays the cursor at the position where the cursor stops when the finger leaving the palm.

As shown in FIG. 5, in some embodiments, while the finger keeps touching the palm, the processor 110 detects/determines a vector v1 of a position p1 and a position p2 on the palm. The position p1 is where the finger first touches the palm (i.e., where the touch to the palm starts). The position p2 is where the finger is currently on the palm. Specifically, the direction of the vector v1 is a direction from the position p1 to the position p2 and a length d2 of the vector v1 is equal to the distance between the positions p1 and p2. In some embodiments, the processor 110 transmits the vector v1 to the storage device 120 and the storage device 120 records the vector v1 (e.g., stores the length d2 and the direction of the vector v1).

In operation, the processor 110 controls/moves the cursor according to the vector v1. Specifically, the processor 110 determines a position p2' where the cursor is currently in the application window. To get the position p2', the processor 110 first generates a vector v1' according to the vector v1. In some embodiments, a direction of the vector v1' is the same as the direction of the vector v1. In some embodiments, a length d2' of the vector v1' is equal to a number n times the length d2 (n*d2). In some embodiments, the number n is proportional to the size of the application window.

As shown in FIG. 5, the position p2' is determined by an addition of the vector v1' and a position p1'. The position p1' is where the display device 130 shows the cursor when the finger starts touching the palm at the position p1. In some embodiments, according to the previous paragraphs, the position p1' is also the position where the cursor is after the last operation to the cursor. After the processor 110 determines the position p2', the display device 130 displays the cursor at the position p2'. In other words, the processor 110 move the cursor from the position p1' to the position p2' according to the vector v1.

In operation 204, the processor 110 determines a touchpad operation to the application window according to a gesture of the dominant hand on the palm of the non-dominant hand. Specifically, the processor 110 detects the gesture of the dominant hand on the palm of the non-dominant hand according to images captured by the camera 140. Then the processor 110 determines a touchpad operation according to the gesture detected. In application, the touchpad operation is one of multiple predefined operations designed to operate the application.

In operation 205, the processor 110 generates control signals to the display device 130 according to the touchpad operation, and the display device 130 adjust the displayed content in response to the control signals. Generally speaking, the display device 130 adjusts the content/elements displayed in the application window according to the touchpad operation.

Reference is now made to FIGS. 1-2 and FIGS. 6-9. FIGS. 6-9 are schematic diagrams of example hand gestures corresponding to different touchpad operations, corresponding to the system 100 in FIG. 1 and the method 200 in FIG. 2, in accordance with some embodiments of the present disclosure.

Figure 6:
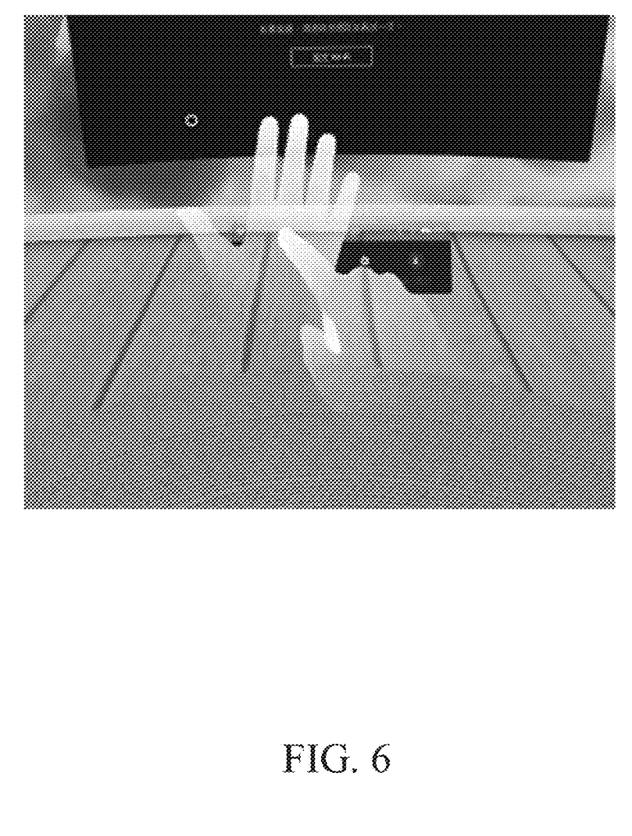
FIGS. 6-9 are schematic diagrams of example hand gestures corresponding to different touchpad operations, corresponding to the system in FIG. 1 and the method in FIG. 2, in accordance with some embodiments of the present disclosure.

For illustration, FIG. 6 depicts a hand gesture of only one finger of the dominant hand touching the palm of the non-dominant hand. According to various embodiments, the described hand gesture of one finger touching the palm corresponds to touchpad operations of text writing operation, cursor moving operation, short click operation, long click operation, and so on.

In some embodiments, when a hand writing operation of the application is performed, the processor 110 determines that the touchpad operation is the text writing operation according to one finger moving on the palm. When the processor 110 determines the touchpad operation being the text writing operation, the processor 110 detects and records the strokes/trace of the one finger sliding/moving on the palm. Then, the processor 110 recognizes a character or a word that the user inputs according to these detected strokes. In some embodiments, the processor 110 inputs the character/word to a user interface element (e.g., a text field) in the application window. In some embodiments, the display device 130 displays the strokes and/or the character/word in the application window.

When the hand writing operation of the application is not performed, the processor 110 determines that the touchpad operation is the cursor moving operation according to one finger moving on the palm. The method for controlling the cursor according to the cursor moving operation is similar to what is described in the paragraphs with reference to FIG. 5. For example, with reference to FIG. 5, in response to detecting the finger keeps touching the palm and moving from the position p1 to the position p2, the processor 110 moving the cursor from the position p1' to the position p2'.

In some embodiments, the processor 110 performs a click operation to where the cursor is in the application window in response to the one finger of the dominant hand starts clicking the palm of the non-dominant hand. For example, the processor 110 detects that the one finger of the dominant hand starts touching the palm of the non-dominant hand at a position, stays in the same position for a time period and leaves the palm at the same position. When this time period is determined shorter than a predefined time period (e.g., 1 second), the processor 110 determines the touch operation as the short click operation. In contrast, when this time period is determined longer than the predefined time period, the processor 110 determines the touch operation as the long click operation.

The described short and long click operations are two different operations to the application. For example, the described short and long click operations may correspond to short and long click operations of a conventional (physical) touchpad. In some embodiments, the described short and long click operations correspond to a left and right click operations of a mouse.

The short or long click operation is performed to where the cursor is in the application window. In some embodiments, the processor 110 select one element at the position of the cursor to perform an operation according to the short or long click operation. For example, a button pointed by the cursor in the application window is pressed in response to a short click operation.

Figure 7:
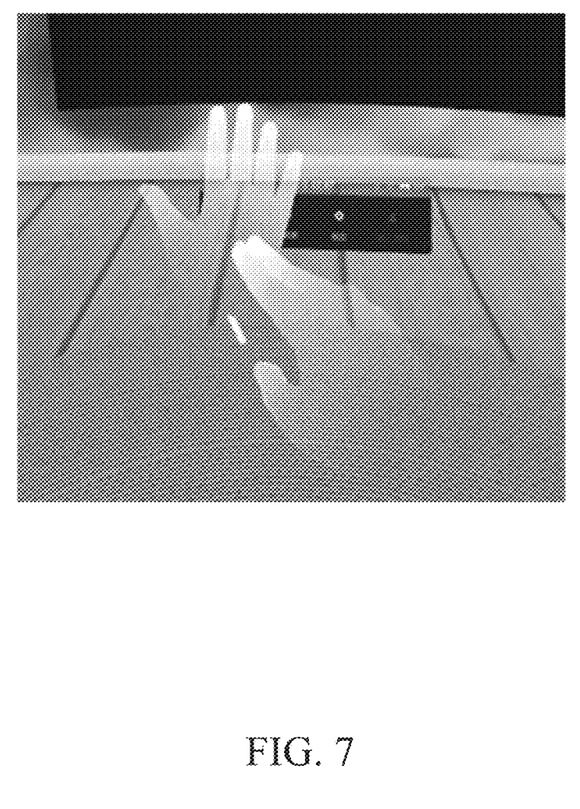

For illustration, FIG. 7 depicts a gesture of the user pressing and holding two fingers to the palm and moving the two fingers toward one direction. According to various embodiments, the described hand gesture of two fingers held and moved on the palm corresponds to touchpad operations of pan operation, slide operation, and so on.

In some embodiments, the processor 110 detects that two fingers (e.g., the middle finger and index finger) of the dominant hand touch the palm of the non-dominant hand and move on the palm in one direction without leaving the palm for a time period. When this time period is determined longer than a predefined time period (e.g., 0.3 seconds), the processor 110 determines the touchpad operation as a pan operation. In contrast, when this time period is determined shorter than the predefined time period, the processor 110 determines the touchpad operation as a slide operation.

In some embodiments, the described pan operation may correspond to a pan operation of a conventional (physical) touchpad. In some embodiments, the described pan operation corresponds to a scroll operation of a mouse. In some embodiments, a content of the application displayed in the application window is moved according to the pan operation.

In some embodiments, the described slide operation may correspond to a slide operation of a conventional (physical) touchpad. In some embodiments, a turning page (i.e., page swiping) operation to a content of the application displayed in the application window is performed according to the slide operation. In other words, the processor 110 performs a turning page operation in response to two fingers of the dominant hand moving on the palm of the non-dominant hand for a time period shorter than the predefined time period.

Figure 8:
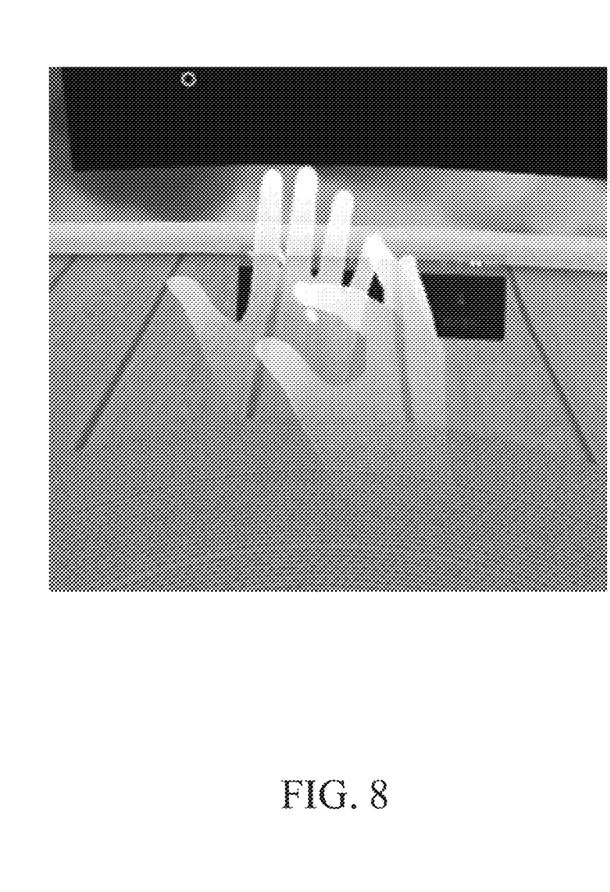

For illustration, FIG. 8 depicts a gesture of two fingers of the dominant hand pinching on the palm of the non-dominant hand, which corresponds to touchpad operations of pinch operation, and so on.

In some embodiments, according to detecting two fingers (e.g., the index finger and the thumb) pressed and held to the palm and the distance between these two fingers increased or decreased, the processor 110 determines the touchpad operation as the pinch operation.

In some embodiments, the described pinch operation may correspond to a pinch operation of a conventional (physical) touchpad. In some embodiments, a scale (resize) operation to a content of the application displayed in the application window is performed according to the pinch operation.

Figure 9:
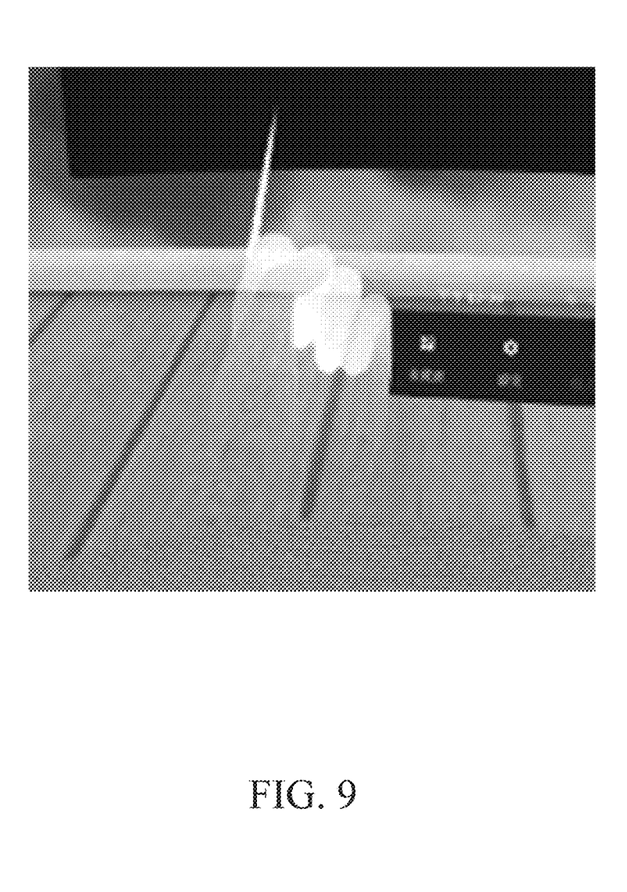

For illustration, FIG. 9 depicts a gesture of one hand clenched into a fist, which corresponds to touchpad operations of the short click operation, the long click operation, and so on.

In some embodiments, the processor 110 detects the non-dominant hand clenching into a first and hold for a time period. When this time period is determined shorter than a predefined time period (e.g., 1 second), the processor 110 determines the touch operation as the short click operation as described above with reference to FIG. 6. In contrast, when this time period is determined longer than the predefined time period, the processor 110 determines the touch operation as the long click operation as described above with reference to FIG. 6.

Figure 10:
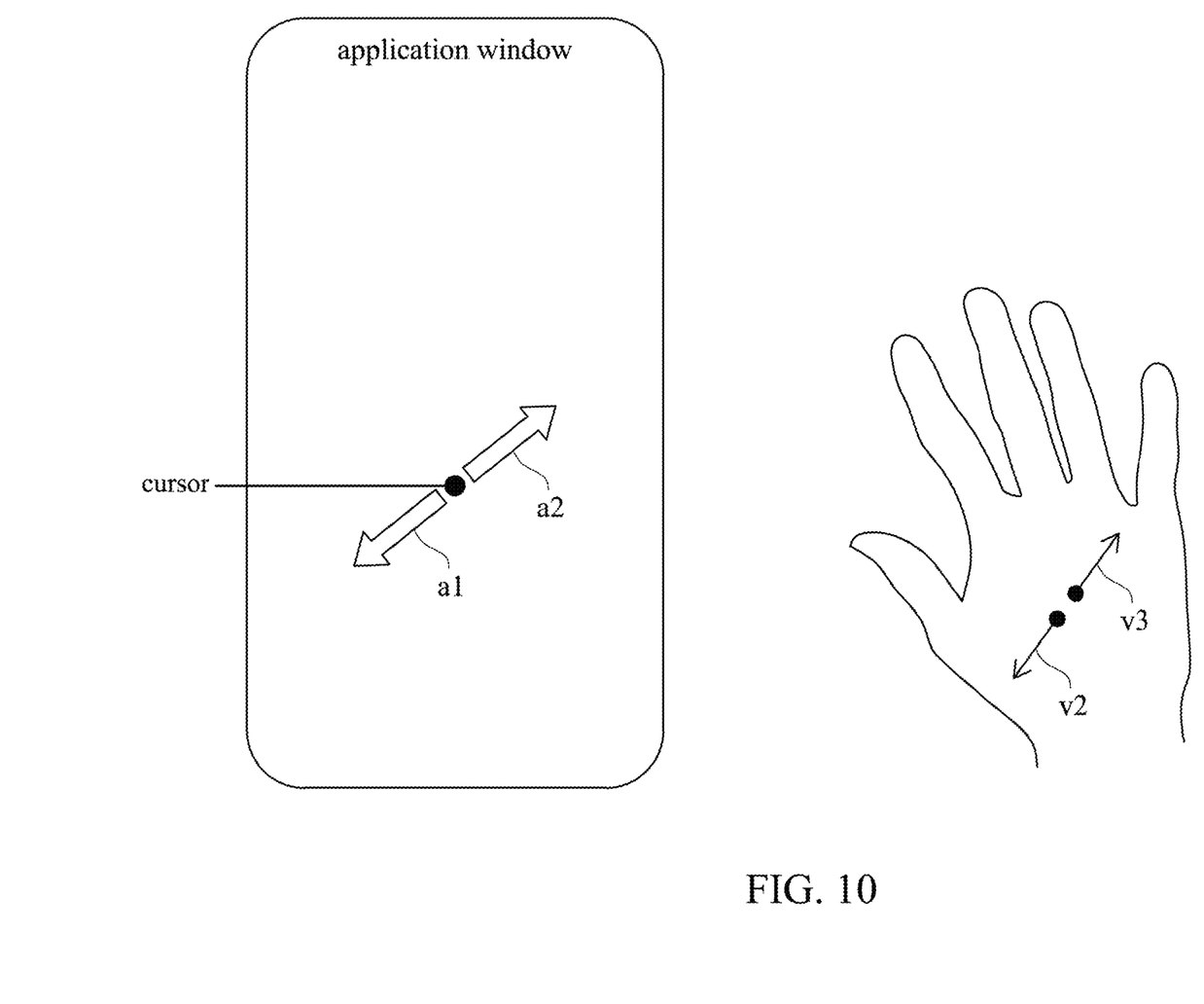
FIG. 10 is a schematic diagram of a content displayed in the application window corresponding to a touchpad operation, corresponding to the system in FIG. 1 and the method in FIG. 2, in accordance with some embodiments of the present disclosure.

Reference is now made to FIGS. 1-2, 7-8 and FIG. 10. FIG. 10 is a schematic diagram of a content displayed in the application window corresponding to a touchpad operation, corresponding to the system 100 in FIG. 1 and the method 200 in FIG. 2, in accordance with some embodiments of the present disclosure.

For illustration, in some embodiments, in response to detecting two fingers touching the palm of the non-dominant hand, the processor 110 detects and records two vectors v2 and v3 corresponding to the two fingers separately. Similar to what is described with reference to FIG. 5, each of the vectors v2 and v3 corresponding is from a position where the corresponding finger first touches the palm to a position where the corresponding finger is currently on the palm.

As shown in FIG. 10, the processor 110 controls the display device 130 to display two arrows a1 and a2 in the application window according to the vectors v2 and v3. In some embodiments, points/heads of the two arrows a1 and a2 indicate/correspond to the two directions of the two vectors v2 and v3 separately. The lengths of the two arrows a1 and a2 correspond to the lengths of the two vectors v2 and v3 separately. For example, in some embodiments, the lengths of the two arrows a1 and a2 equal to the number n times the lengths of the two vectors v2 and v3 separately.

In some embodiments, the described arrows displayed in the application window start from the position (or edge) of the cursor, in which the cursor is at the position where the cursor is moved to according to the last cursor moving operation. In some embodiments, the described arrows shown in FIG. 10 are displayed according to a pinch operation.

The configurations of FIGS. 3-10 are given for illustrative purposes. Various implements are within the contemplated scope of the present disclosure. For example, the application window and/or the cursor may be displayed with different shapes, size, etc.

In some embodiments, the system 100 controls the application and the content displayed in the application window through eye tracking. Specifically speaking, the camera 140 and/or other camera/sensors of the system 100 detect eye positions and/or eye movement, and the processor 110 determines operations to the application according to the detected eye positions and/or eye movement.

Similar to what is described with reference to FIG. 6, in some embodiments, the processor 110 performs a short/long click operation through eye tracking. For example, in response to detecting a first eye (e.g., left eye) close for over a predefine time period (e.g., 1 second) with a second eye (e.g., right eye) keeping open, the processor 110 performs the short click operation; and in response to detecting the second eye close for over the predefine time period with the first eye keeping open, the processor 110 performs the long click operation.

In some embodiments, in response to detecting two eyes close for over the predefine time period (e.g., 1 second) and then open, the processor 110 performs an operation different from the short and long click operations. For example, the processor 110 performs an operation corresponding to a click operation of the scroll wheel/function key of a mouse according to two eyes close for over the predefine time period.

As described in the previous paragraphs with reference to FIGS. 3 and 4, when the two hands are separated from each other for over the distance d1, the cursor used to indicate the touchpad operation of cursor movement is hidden. According to some embodiments of the present disclosure, in response to detecting the two hands separated from each other for over the distance d1 and the cursor hidden, the processor 110 controls the application through eye tracking or ray casting operations instead of the touchpad operations, for example, controlling the cursor according to the eye movements, a ray of a hand held controller or a position of the dominant hand in the air.

According to the foregoing description, the present disclosure provides an extended reality system and method, in which the user can control the application in the extended reality system through two hands. The extended reality system and method determine operations of a dominant hand to a non-dominant hand as touchpad operations to simulate a touchpad for controlling the application. With the provided system and method, the user can control the application easily and intuitively with a feedback of pressure when pressing or sliding on the palm to control the application.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An extended reality system, comprising:
a display device configured to display an extended reality with an application window;
a camera configured to capture images; and
a processor configured to:
detect a first hand and a second hand in the images;
control the display device to display a cursor at a first position in the application window in response to a distance between a finger of the first hand and the palm of the second hand being within a predetermined distance,
wherein the first position is where the cursor was in the application window when the distance between the finger of the first hand and the palm of the second hand increased to be greater than the predetermined distance last time;
control the cursor in the application window according to where the finger of the first hand is on the palm of the second hand based on the images; and
determine an operation performed at a position of the cursor according to a gesture of the first hand on the palm of the second hand.

2. The extended reality system of claim 1, wherein the processor is further configured to recognize a text to input to an user interface element in the application window according to a trace of the finger of the first hand on the palm of the second hand.

3. The extended reality system of claim 1, wherein the processor is further configured to perform a click operation to where the cursor is in the application window in response to the finger of the first hand clicking the palm of the second hand.

4. The extended reality system of claim 1, wherein the processor is further configured to perform a resize operation to a content displayed in the application window in response to two fingers of the first hand pinching on the palm of the second hand.

5. The extended reality system of claim 1, wherein the processor is further configured to perform a turning page operation to a content displayed in the application window in response to two fingers of the first hand moving on the palm of the second hand for a first time shorter than a predefined time.

6. The extended reality system of claim 5, wherein the processor is further configured to perform a pan operation to the content displayed in the application window in response to the two fingers of the first hand moving on the palm of the second hand for a second time longer than the predefined time.

7. The extended reality system of claim 1, wherein the processor is further configured to:
detect a first position where the finger of the first hand first touches the palm of the second hand and a second position where the finger of the first hand leaves from the palm of the second hand; and
move the cursor according to a vector between the first position and the second position.

8. The extended reality system of claim 1, further comprising a sensor that is configured to sense eye closing,
wherein the processor is further configured to perform a click operation to where the cursor is in the application window in response to the sensor sensing an eye closing.

9. An extended reality system, comprising:
a first camera configured to capture images;
a display device configured to display an application window; and
a processor configured to:
detect a first hand and a second hand that are in the images;
determine a gesture of the first hand that is on a palm of the second hand as a touchpad operation configured to control the application window; and
in response to a first finger and a second finger of the first hand touching the second hand at a same time, control the display device to display a first arrow and a second arrow corresponding to the first and second fingers respectively in the application window,
wherein a first direction of the first arrow and a second direction of the second arrow are equal to moving directions of the first and second fingers respectively.

10. The extended reality system of claim 9, wherein the processor is further configured to move a cursor in the application window in response to one finger of the first hand moving on the palm of the second hand.

11. The extended reality system of claim 9, further comprising a second camera to perform eye tracking,
wherein the processor is further configured to move a cursor in the application window according to the eye tracking in response to the first hand is separated from the second hand by a predefined distance.

12. A method for operating an extended reality system, comprising:
displaying an extended reality including an application window;
capturing images of a first hand and a second hand;
controlling the display device to display a cursor at a first position in the application window in response to a distance between a finger of the first hand and the palm of the second hand being within a predetermined distance,
wherein the first position is where the cursor was in the application window when the distance between the finger of the first hand and the palm of the second hand increased to be greater than the predetermined distance last time;

controlling the cursor in the application window according to a position of the finger of the first hand on the palm of the second hand;
determining a touchpad operation configured to control the application window according to a gesture of the second hand on the palm of the first hand; and
adjusting a content in the application window according to the touchpad operation.

13. The method of claim 12, further comprising:
in response to the second hand being clenched for a first time shorter than a predefined time, determining the touchpad operation to the application window as a short click operation that clicks where the cursor is.

14. The method of claim 13, further comprising:
in response to the second hand being clenched for a second time longer than the predefined time, determining the touchpad operation to the application window as a long click operation that clicks where the cursor is and holds for the second time.

15. The method of claim 12, further comprising:
displaying the cursor with a first color in response to the first hand touching the second hand;
displaying the cursor with a second color in response to the first hand and the second hand separated by a first distance shorter than a predefined distance; and
hiding the cursor in response to the first hand and the second hand separated by a second distance longer than the predefined distance.

16. The method of claim 15, further comprising:
in response to the first hand and the second hand separated by the second distance longer than the predefined distance, determining the touchpad operation to the application window as a short click operation according to a first eye being close and a second eye being open.

17. The method of claim 16, further comprising:
in response to the first hand and the second hand separated by the second distance longer than the predefined distance, determining the touchpad operation to the application window as a long click operation according to the first eye being open and the second eye being close.

18. The method of claim 12, further comprising:
in response to the first hand and the second hand separated by a first distance longer than a predefined distance, moving the cursor according to a position of the first hand.

19. The method of claim 12, further comprising:
recognizing a text to input to an user interface element in the application window according to traces of the finger of the first hand on the palm of the second hand.

20. The method of claim 12, further comprising:
in response to two fingers of the first hand touching the palm of the second hand, displaying two arrows starting from the cursor in the application window, wherein lengths of the two arrows is according to vectors of the two fingers moved on the palm of the second hand.

\* \* \* \* \*